United States Patent [19]

Sell et al.

[11] Patent Number: 4,560,042
[45] Date of Patent: Dec. 24, 1985

[54] METHOD OF SELF-PRESSURIZING A DAMPER

[75] Inventors: Jeffrey A. Sell, Huntington Woods; Tenneille W. Capehart, Rochester; Roy Richter, Ann Arbor, all of Mich.

[73] Assignee: General Motors Corporation, Detroit, Mich.

[21] Appl. No.: 605,627

[22] Filed: Apr. 30, 1984

[51] Int. Cl.⁴ .............................................. F16F 9/43
[52] U.S. Cl. ................................ 188/322.21; 188/315; 188/322.5
[58] Field of Search ................... 188/269, 315, 322.21, 188/322.5

[56] References Cited

U.S. PATENT DOCUMENTS

| 2,774,446 | 12/1956 | de Carbon | 188/317 X |
| 3,024,875 | 3/1962 | Stultz | 188/88 |
| 3,750,855 | 8/1973 | Peddinghaus | 188/269 |
| 3,945,663 | 3/1976 | Duckett | 188/315 |

FOREIGN PATENT DOCUMENTS 86644  5/1982  Japan ............................. 188/322.21

OTHER PUBLICATIONS

Bilstein Brochure (printed Aug. 1983).
Brake & Front End–Jul. 1982–pp. 17 & 18.

*Primary Examiner*—Duane A. Reger
*Attorney, Agent, or Firm*—Lawrence B. Plant

[57] ABSTRACT

A method of self-pressurizing a piston-and-rod hydraulic damper by providing at least two gas-generating reactants in the damper's reservoir which reactants are separated one from the other by a temporary barrier. The barrier is subsequently removed, after the damper is filled and sealed, so as to permit the reactants to combine and generate the pressurizing gas. A capsule containing both reactants and a meltable barrier is disclosed.

4 Claims, 6 Drawing Figures

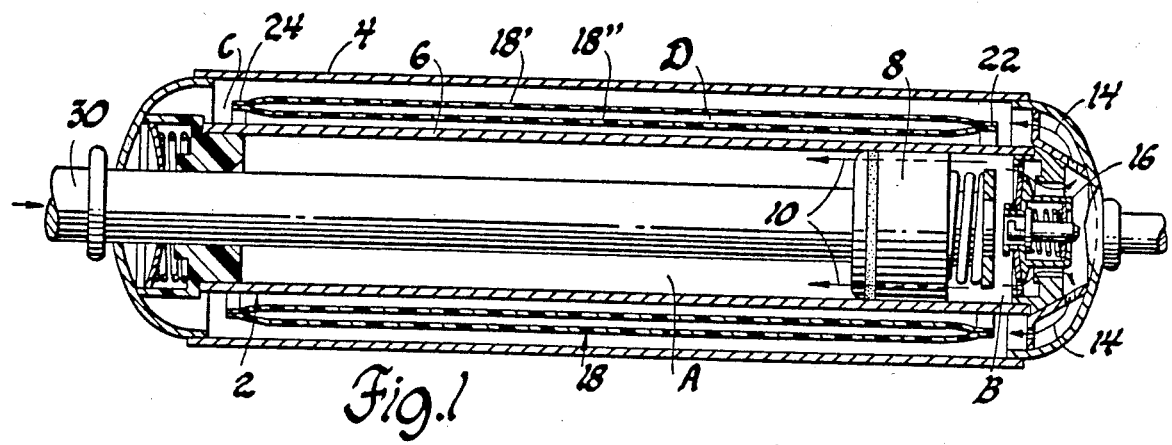
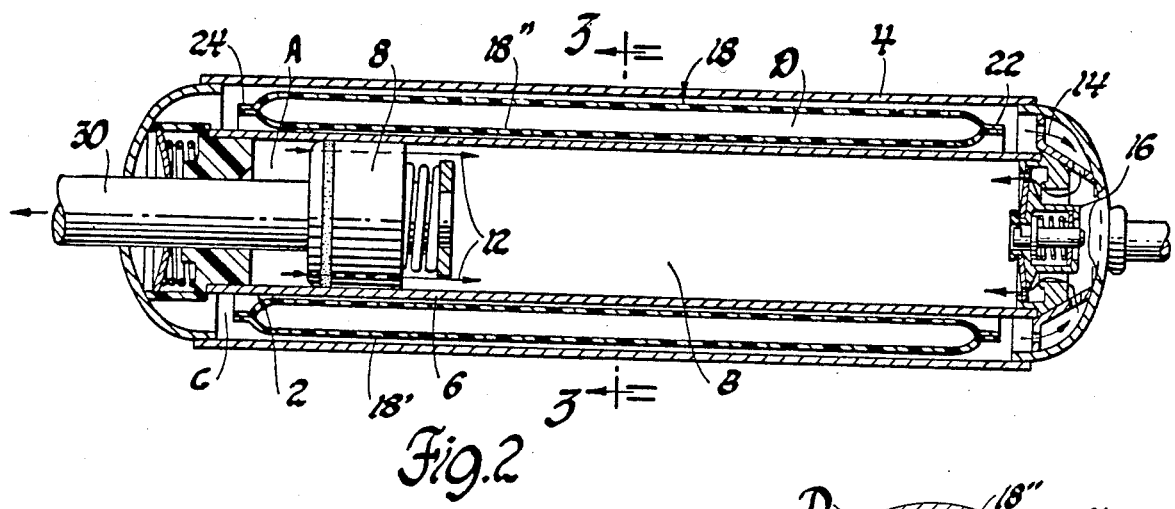
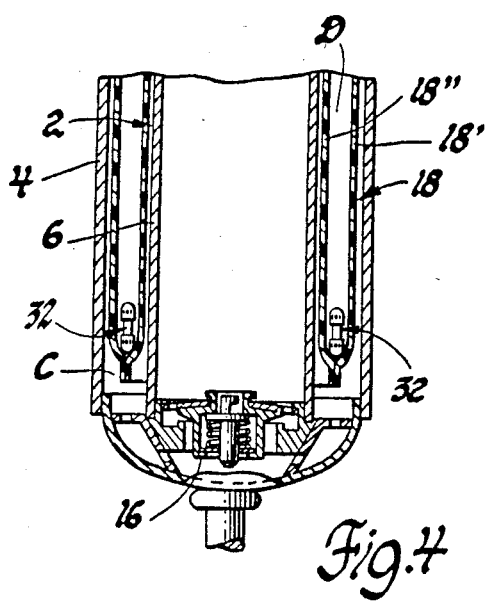
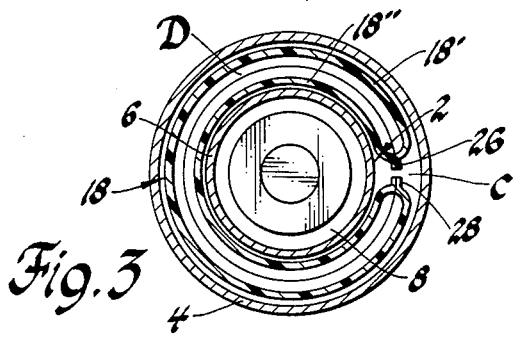
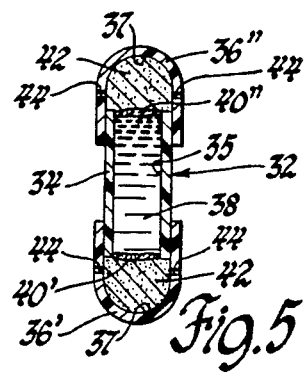
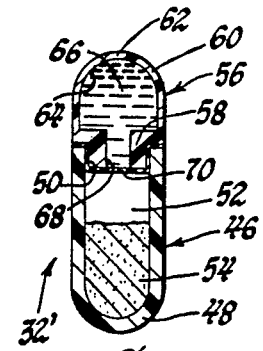

METHOD OF SELF-PRESSURIZING A DAMPER

This invention relates to a method of making self-pressurized, hydraulic, shock dampening devices (e.g., automobile shock absorbers or shock dampening struts) of the piston-and-rod type.

BACKGROUND OF THE INVENTION

A typical piston-and-rod type hydraulic shock dampening device (hereafter damper) comprises essentially: (1) a working cylinder filled with hydraulic fluid (hereafter oil); and (2) a gas-charged reservoir adjacent the working cylinder which receives and dispenses oil from and to the working cylinder during the damper's compression and rebound strokes respectively. The working cylinder comprises a damping, rod-carrying piston axially slidable within a close fitting surrounding tube. The piston has appropriate passages therethrough, and damping valves therein, which control the flow of oil from one side of the piston to the other as it reciprocates within the tube. One end of the working cylinder is sealed shut and about the piston rod while the other end communicates with the reservoir to permit oil to shuttle back and forth between the working cylinder and the reservoir as required. The reservoir contains a pocket of cushioning gas which compresses during the damper's compression stroke and expands during the damper's rebound stroke in order to accommodate the otherwise incompressible oil flowing from and to the working cylinder. The expansion and compression of the gas cushion also accommodates the contraction and expansion of the hydraulic oil at various temperatures. In so-called "single tube" dampers, the reservoir is aligned axially with the working cylinder and is usually defined by a simple extension of the same tube that defines the working cylinder. In so-called "double tube" dampers, the working cylinder is surrounded by a radially spaced second tube (known as the reservoir tube) and the annular space therebetween becomes the reservoir.

It is known to physically separate the oil from the cushioning gas in the reservoir in order to prevent the gas from aerating and foaming the oil. In this regard, aeration of the oil with cushioning gas is the primary cause of a condition known as "lag" which is lost motion occurring in the damping piston due to the presence of compressible hydraulic fluid (i.e., the aerated oil) in the working cylinder. One manufacturer (i.e., of single tube dampers), positions a floating piston between the gas pocket and the oil in the reservoir to isolate one from the other. Other manufacturers package the cushioning gas in a hermetically sealed, gas-filled bladder which is submerged in the oil in the reservoir. One such bladder-containing damper of the double-tube type is disclosed in Stultz U.S. Pat. No. 3,024,875, which is assigned to the assignee of the present invention and is specifically incorporated herein by reference. Generally speaking Stultz discloses a Freon-filled bladder made from thin nylon or Mylar sheets sealed together along their edges. Assemblywise, Stultz's bladder is: filled with approximately one atmosphere (i.e., room temperature and rod extended) of Freon; curled; and inserted into the reservoir tube. Thereafter, the working cylinder is inserted into the center of the curled bladder and oil poured to overflowing into both the cylinder and the reservoir. The cylinder and reservoir tubes are then capped and welded closed. The cap for the working cylinder includes appropriate passages and valving for communication with the surrounding reservoir. In more recent years $SF_6$ gas has been used in place of Freon.

It is also known to pressurize the cushioning gas pocket to superatmospheric pressures ranging from about 2 to about 20 atmospheres. Pressurization helps to reduce lag due to reservoir gas-oil mixing (i.e., in bladderless dampers) and also reduces a condition known as "cavitational" lag which otherwise occurs in both bladder-type and bladderless dampers. Cavitational lag results from vaporization of the oil in the damper and subsequent aeration of the oil with the oil vapor. Superatmospheric pressurization not only reduces the amount of vapor that is formed but also so shrinks the size of the bubbles that are formed as to render them virtually harmless, lag-wise. Finally, superatmospheric pressurization imparts gas-spring characteristics to the damper which supplement the primary springs of the vehicle for improved control and handling of the vehicle.

A number of techniques for superatmospherically pressurizing dampers are known. One technique, for example, charges a single tube damper (i.e., with axially aligned reservoir and a floating oil-gas separating piston) by means of a special fixture sealingly secured to the open end of the tube defining the cylinder and reservoir. The fixture holds the floating and working pistons away from the mouth of the tube while the cushioning gas is pumped into the tube to a predetermined first pressure. Thereafter: (1) the floating and working pistons are pushed into the tube to compress the gas to a second predetermined working pressure; (2) the operating oil is pumped in behind the working piston; (3) the tube is sealed closed; and (4) the special fixture is removed. Another technique fully assembles a bladderless double-tube damper and then pressurizes it by: piercing the reservoir tube; injecting the cushioning gas under pressure into the reservoir; and finally welds shut the pierced hole. Still another technique (i.e., for bladder-type, double-tube dampers) provides a special sealable fitting through the wall of the reservoir tube and the bladder through which cushioning gas is pumped into the bladder from an external source after the damper has been filled and sealed (e.g., see Ducket U.S. Pat. No. 3,945,663). United States patent application USSN filed concurrently herewith in the names of Robert D. Wight and Carlyle H. Wokasien is assigned to the assignee of the present invention and describes a technique for self-pressurizing dampers. That technique is particularly useful to pressurize bladder-type dampers such as Stultz U.S. Pat. No. 3,024,875 (supra) where the bladder is completely submerged in the reservoir oil so as to be incommunicado the outside of the damper. Wight et al describes the in situ, self-pressurization of a gas-charged hydraulic damper to superatmospheric pressure (i.e., at room temperature) by positioning a dormant gasifiable substance(s) in the damper's reservoir (with or without a bladder) which substance, when activated undergoes a chemical or physical change to generate a superatmospheric pressure of a noncondensible gas inside the damper. The substance(s) remain dormant (i.e., in the liquid or solid state(s)) until after the damper is filled with oil and sealed shut, and is thereafter activated by the application of external energy (e.g., heat) to the damper.

It is an object of the present invention to provide an improved Wight et al-type self-pressurization process by utilizing a reaction between two or more components, initially separated one from the other(s), but subsequently combined to generate the pressuring gas after the damper has been filled and sealed. This and other objects and advantages of the present invention will become more readily apparent from the detailed description thereof which follows.

BRIEF DESCRIPTION OF THE INVENTION

The present invention comprehends a method for the in situ, self-pressurization of a gas-charged hydraulic damper by: positioning a gasifiable substance and a reagent reactive therewith in the gas pocket of the damper (i.e., with or without a bladder); positioning a temporary barrier between the substance and the reagent to temporarily isolate one from the other; and, subsequently, removing the barrier so as to combine the substance and reagent for generating superatmospherically pressurized gas in the gas pocket after the damper has been filled and sealed shut. The process is useful with virtually any substance-reagent couple capable of irreversibly generating sufficient gas to pressurize the damper. Hence a variety of reaction couples such as (1) $CH_3COOH+Na_2CO_3=CO_2$, (2) $Ca_3N_2+H_2O=NH_3$, (3) $Al_4C_3+H_2O=CH_4$, (4) $Na_2O_2+H_2O=O_2$, (5) $HCl+Zn=H_2$ etc., are all potentially useful in the process of the present invention.

The temporary barrier separating the components may be removed by displacement (e.g., unplugging) or destruction (e.g., rupturing, dissolving, melting, etc.). Preferably the barrier is melted and hence will comprise a readily fusible material such as wax or low melting plastic. The components may be packaged with the barrier in a variety of ways. For example, one component may be contained in a pouch, ampule, etc., formed from the barrier material and immersed in the other component. Preferably, however, both components are packaged together in a single capsule or the like, with only a thin plug or membrane of the barrier material separating them from each other. In a most preferred embodiment, the capsule will comprise a tubular center portion filled with one of the components and sealed off at both ends with a low melting barrier material. Perforated caps, filled with the other component, are positioned on both ends of the tube. The capsule will preferably be standardized as to size in that each capsule will generate the same amount of gas so that one or more of the capsules may be used, as required, depending on the size of the damper and the pressure sought to be obtained therein. In this regard, enough of the components are provided in the reservoir's gas pocket to raise the room temperature pressure in the pocket to at least about 2 atmospheres and upwards to as much as about 10 atmospheres.

After assembly and sealing, the barrier is removed (e.g., the damper is heated sufficiently to melt the barrier) to permit the components to flow together, react and pressurize the gas pocket.

DETAILED DESCRIPTION OF A SPECIFIC EMBODIMENT OF THE INVENTION

FIG. 1 depicts, in partial section, a prior art, bladder-type, double-tube shock absorber with its working piston near the end of its compression stroke;

FIG. 2 depicts the shock absorber of FIG. 1 with its working piston near the end of its rebound stroke;

FIG. 3 is a section taken in the direction 3—3 of FIG. 2;

FIG. 4 is a partial view of a shock absorber like that shown in FIG. 2 depicting one embodiment of the present invention;

FIG. 5 is an enlarged longitudinal sectional view of the pressurizing capsule 32 of FIG. 4; and FIG. 6 is an enlarged longitudinal sectional view of another pressurizing capsule embodiment.

FIGS. 1–3 depict a simple, bladder-type, double-tube shock absorber comprising essentially a working cylinder 2, a surrounding reservoir tube 4 and an annular reservoir chamber C therebetween, and will serve to illustrate the basic structure and operation of gas-charged hydraulic dampers in general. The working cylinder 2 comprises a tube 6 defining working chambers A and B which are separated one from the other by a damping piston 8. Damping piston 8 contains appropriate internal passages and damping valves (not shown) for controlling the flow of hydraulic oil between chambers A and B as indicated by the arrows 10 and 12. In FIG. 1 the working piston 8 is shown near the end of its compression stroke and the arrows 10 show the oil flowing from the compression control chamber B through the piston 8 into the rebound control chamber A. Any excess oil in the compression control chamber B is forced into the reservoir chamber C (see arrows 14) via an appropriate valving arrangement 16 at the end of the working cylinder 2. The reservoir chamber C contains a substantially atmospherically pressurized bladder 18 which defines a cushioning gas pocket D such as described in Stultz supra. During the compression stroke the gas cushion D is compressed to accommodate the oil flowing into the reservoir C from the cylinder 2. The bladder 18, here depicted, comprises simply two sheets of gas impermeable plastic 18' and 18" which are heat sealed together along their edges 22, 24, 26 and 28. During assembly, the bladder is curled to fit inside the reservoir tube 4 and the working cylinder 12 thereafter inserted into the center of the curled bladder 18. The working cylinder and reservoir C are then completely filled with oil so that the atmospherically pressurized bladder 18 is totally immersed within the hydraulic fluid in the reservoir C and has no means for communicating with the outside of the shock absorber (i.e., incommunicado the ambient).

FIG. 2 shows the shock absorber of FIG. 1 near the end of its rebound stroke wherein the rod 30 attached to the piston 8 is in substantially its fully extended position. As the piston 8 moves through its rebound stroke, oil from the rebound chamber A flows through the piston 8 into the compression chamber B as indicated by the arrows 12. At the same time, the excess hydraulic oil earlier dumped into the reservoir C during compression is now returned to the compression chamber B via the valving arrangement 16 due to the force exerted by expansion of the gas in the cushioning gas pocket D earlier compressed in the compression stroke.

FIG. 4 illustrates a prior art damper like that shown in FIGS. 1–3 which is provided with a superatmospherically self-pressurizable bladder in accordance with the present invention. The shock absorbed is assembled in substantially the same manner as dampers having atmospherically pressurized bladders but wherein the bladder 18 also contains a plurality of pressurizing capsules 32, each containing a gasifiable substance and a reagent reactive with the substance to generate the pressuring gas. Alternatively, a single larger capsule may be substituted for the many smaller ones. The use of many small standardized capsules, however, is preferred as it permits shock absorbers to be made with many different pressures and/or many different gas-pocket sizes by merely adjusting the number of standard-sized capsules used for each individualized application.

FIG. 5 shows a pressurizing capsule 32 comprising a tubular center portion 34 and two perforated end caps 36' and 36" therefor. The tubular portion 34 defines a first chamber 35 filled with one of the reactants 38 and sealed at both ends by wax plugs 40' and 40". The end caps 36'-36" each define a second chamber 37 filled with the other of the reactants 42. Heating of the damper causes the wax plugs 40 to melt thereby bringing the reactants 38 and 42 together to generate the pressurizing gas. The gas so generated exits the capsule 32 via a plurality of small openings 44 in the end caps 36.

FIG. 6 shows another embodiment of a pressurizing capsule 32' comprising a rigid tubular portion 46 having a closed one end 48 and an open mouth 50 at the other end. The tubular portion 46 defines a first chamber 52 filled with one of the reactants 54. An elastomeric plug 56 closes off the mouth 50 of the tubular portion 46. The plug 56 comprises an annular neck portion 58 tightly engaging the mouth 50 and a bulbous portion 60 comprising a thin elastomeric wall 62 defining a second chamber 64 filled with the other of the reactants 66. The neck portion 58 defines an opening 68 extending between the first chamber 52 and the second chamber 64 for passing reactant 66 therethrough and into chamber 52. A thin rupturable membrane 70 (e.g., plastic film) extends across the opening 68 and is held in place between the neck 58 and the mouth 50 of tube 46. The damper is assembled and filled with hydraulic oil with the rod fully extended. After sealing, the rod is pushed into the damper thereby increasing the pressure in the reservoir which in turn compresses the bulbous portion 60 (much like an eyedropper) and diplaces the liquid reactant 66 through the opening 68 so as to rupture the membrane 70 and enter the reaction chamber 52. Alternatively, the thin membrane 70 may be replaced with a small plug (not shown) which fits snugly within the opening 68 under ordinary pressure conditions but which is blown out of the opening 68 into the reaction chamber 52 when the piston rod is pushed into the damper. The gas generated exits the capsule 32 by blowing off the plug 56 or rupturing the wall 62 by the internal pressure generated by the gas. Alternatively, small plugged holes may be provided in the tube 46. The plugs are sufficient to seal off the inside of the tube during compression of the bulb 60 but will blow out as the internal pressure builds.

In one example of the process, a double tube shock absorber of the type shown essentially in FIGS. 1–3 is self pressurized to about 10 atmospheres as follows. The shock absorber is assembled with a 25 cc air-filled saran bladder (i.e., one atmosphere at room temperature) containing a pressurizing capsule comprising a teflon center tube and two end caps essentially as shown in FIG. 5. The tube is filled with 2 cc of concentrated acetic acid and plugged at both ends with ULTRA-FLEX ® Plastic Wax (m.p. 150° F.) manufactured by the Bareco Division of the Petrolite Corp. The end caps contain about 2 grams of sodium carbonate ($Na_2CO_3$). After filling with hydraulic fluid and sealing shut, the damper is heated in an oven sufficiently to elevate the temperature inside the bladder to above the melting point of the wax plugs (ca. 150° F.) and held thereat sufficiently long for the plugs to melt and the acid to react with the carbonate to pressurize the bladder to about 10 atmosphere with $CO_2$.

While the invention has been described primarily in terms of a bladder-type, double-tube shock absorber, it is to be understood that the principals involved therein are equally applicable to pressurized dampers of the bladder-free, free-floating piston single-tube type as well. Hence, the invention is not limited to the specific embodiments described herein but rather only to the extent set forth hereafter in the claims which follow.

The embodiments of the invention in which an exclusive property or privilege is claimed are defined as follows:

1. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement comprising activating said substance by:
   positioning a temporary barrier between said substance and a reagent reactive with said substance to generate said gas; and
   removing said barrier such as to permit said substance and said reagent to flow together, react, generate said gas and thereby boost the pressure in said pocket.

2. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement comprising activating said substance by:
   positioning a fusible barrier between said substance and a reagent reactive with said substance to generate said gas; and
   destroying said barrier such as to permit said substance and said reagent to flow together, react, generate said gas and thereby boost the pressure in said pocket.

3. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement comprising activating said substance by:
   positioning a fusible barrier between said substance and a reagent reactive with said substance to generate said gas; and heating said damper sufficiently to fuse said barrier and permit said substance and reagent to flow together, react, generate said gas and thereby boost the pressure in said pocket.

4. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement comprising:

positioning a pressurizing capsule in said reservoir, said capsule having a first chamber containing said substance, a second chamber containing a reagent reactive with said substance to generate said gas and a temporary barrier between said chambers for separating said substance from said reactant; and removing said barrier such as to open said chambers one to the other and permit the contents thereof to flow together, react, generate said gas and thereby boost the pressure in said pocket.

* * * * *

UNITED STATES PATENT AND TRADEMARK OFFICE
CERTIFICATE OF CORRECTION

PATENT NO. : 4,560,042

DATED : December 24, 1985

INVENTOR(S) : Jeffrey A. Sell et al

It is certified that error appears in the above—identified patent and that said Letters Patent is hereby corrected as shown below:

Column 4, line 38, "12" should read -- 2 --.

Column 5, line 37, "diplaces" should read -- displaces --.

Claim 2, column 6, line 41, "fusible" should read -- destructible --.

Signed and Sealed this

Twenty-ninth Day of April 1986

[SEAL]

Attest:

DONALD J. QUIGG

Attesting Officer

Commissioner of Patents and Trademarks